United States Patent
Minakuti et al.

(10) Patent No.: US 10,257,431 B2
(45) Date of Patent: Apr. 9, 2019

(54) FILTER CONTROL DEVICE, FILTER CONTROLLING METHOD, AND IMAGING DEVICE

(71) Applicant: SONY CORPORATION, Tokyo (JP)

(72) Inventors: Jun Minakuti, Tokyo (JP); Akira Takeo, Saitama (JP); Yasutoshi Katsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 40 days.

(21) Appl. No.: 15/321,285

(22) PCT Filed: Jun. 24, 2015

(86) PCT No.: PCT/JP2015/068148
§ 371 (c)(1),
(2) Date: Dec. 22, 2016

(87) PCT Pub. No.: WO2016/006440
PCT Pub. Date: Jan. 14, 2016

(65) Prior Publication Data
US 2017/0163864 A1    Jun. 8, 2017

(30) Foreign Application Priority Data

Jul. 8, 2014    (JP) .................. 2014-140151

(51) Int. Cl.
*H04N 5/238*        (2006.01)
*G03B 11/00*        (2006.01)
(Continued)

(52) U.S. Cl.
CPC ............. *H04N 5/238* (2013.01); *G02B 27/46* (2013.01); *G02F 1/13363* (2013.01);
(Continued)

(58) Field of Classification Search
CPC ...... H04N 5/238; H04N 5/2254; G03B 11/00; G02F 1/134309; G02F 1/13363; G02F 2413/02
See application file for complete search history.

(56) References Cited

U.S. PATENT DOCUMENTS

| | | | |
|---|---|---|---|
| 2004/0174444 A1* | 9/2004 | Ishii .................. | H04N 5/232 348/240.1 |
| 2007/0257996 A1* | 11/2007 | Kurosawa ............ | G06T 3/4015 348/240.99 |
| 2010/0238328 A1* | 9/2010 | Pillman .................. | H04N 5/217 348/241 |

FOREIGN PATENT DOCUMENTS

| | | |
|---|---|---|
| JP | 2000-314915 A | 11/2000 |
| JP | 2007-094276 A | 4/2007 |

(Continued)

OTHER PUBLICATIONS

International Search Report and Written Opinion of PCT Application No. PCT/JP2015/068148, dated Sep. 29, 2015, 11 pages of English Translation and 10 pages of ISRWO.

(Continued)

*Primary Examiner* — Mekonnen D Dagnew
(74) *Attorney, Agent, or Firm* — Chip Law Group

(57) ABSTRACT

A filter control device of the present disclosure includes a filter controller that performs control to cause low-pass characteristics of an optical low-pass filter mounted in an imaging device to be changed in accordance with change in an image shooting range.

13 Claims, 13 Drawing Sheets

(51) Int. Cl.
    *G02B 27/46*     (2006.01)
    *H04N 5/225*     (2006.01)
    *G02F 1/13363*   (2006.01)
    *G02F 1/1343*    (2006.01)

(52) U.S. Cl.
    CPC ........ *G02F 1/134309* (2013.01); *G03B 11/00* (2013.01); *H04N 5/225* (2013.01); *H04N 5/2254* (2013.01); *G02F 2413/02* (2013.01)

(56) References Cited

FOREIGN PATENT DOCUMENTS

| | | | |
|---|---|---|---|
| JP | 2007-104419 A | | 4/2007 |
| JP | 2007104419 A | * | 4/2007 |
| JP | 2007-334708 A | | 12/2007 |
| JP | 2013-217971 A | | 10/2013 |

OTHER PUBLICATIONS

International Preliminary Report on Patentability of PCT Application No. PCT/JP2015/068148, dated Jan. 10, 2017, 11 pages of English Translation and 07 pages of IPRP.

* cited by examiner

[ FIG. 1 ]
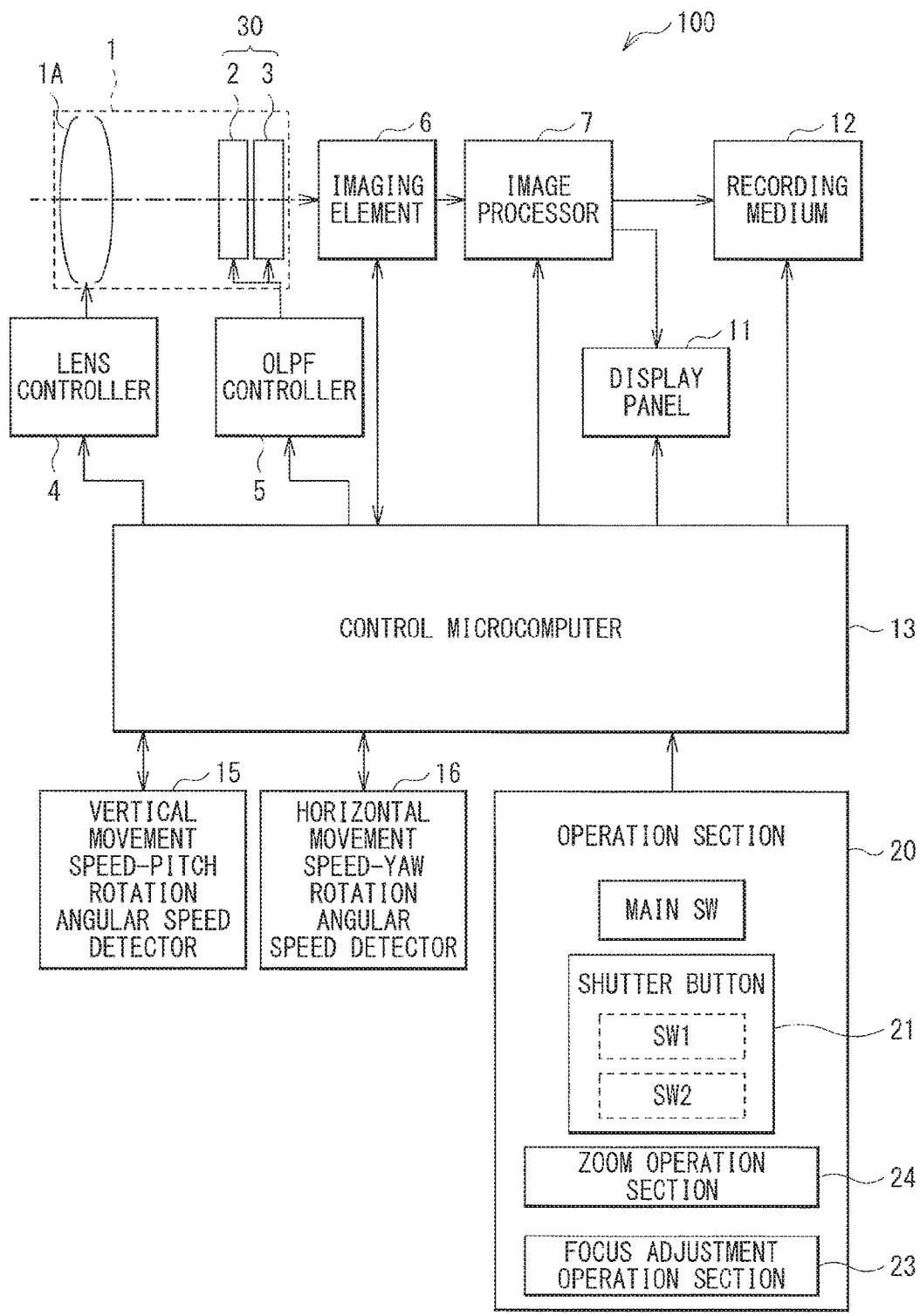

[ FIG. 2 ]
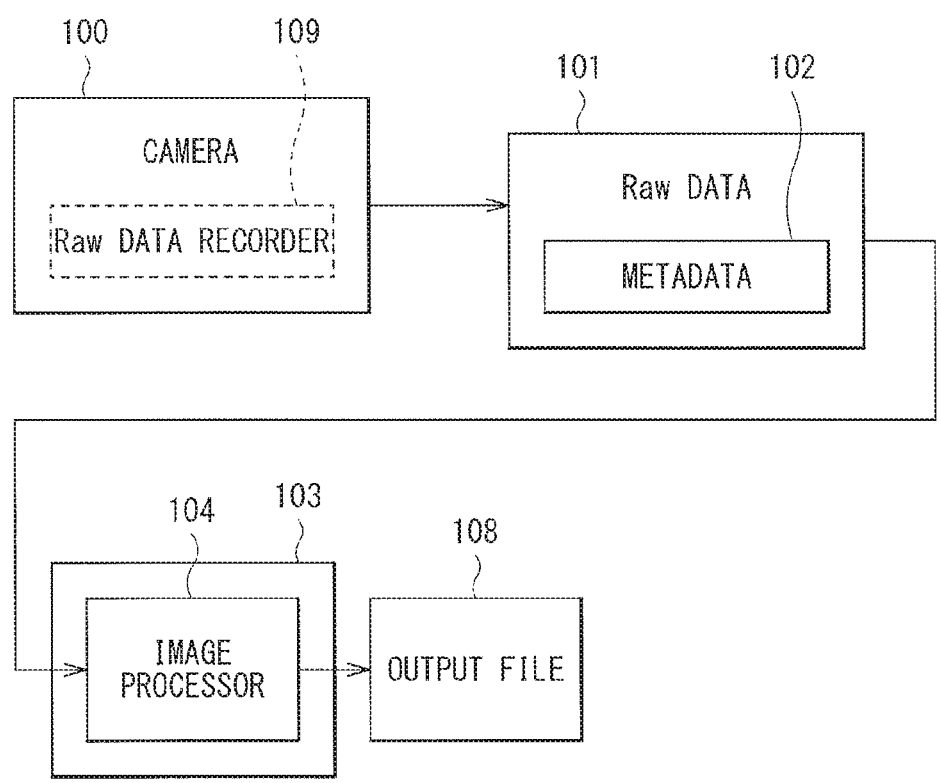

[ FIG. 3 ]
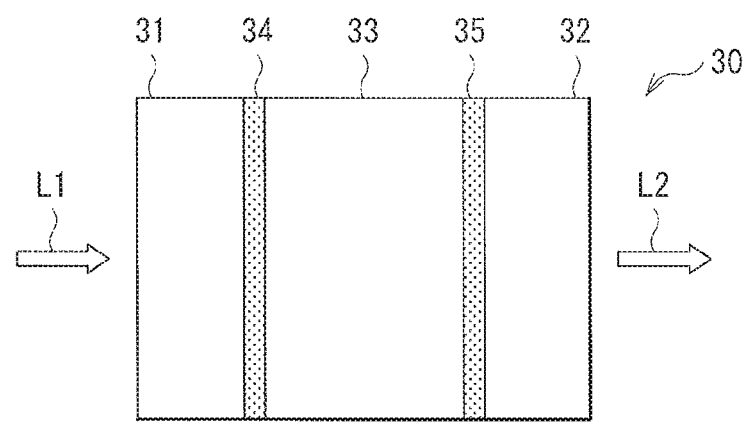
[ FIG. 4 ]
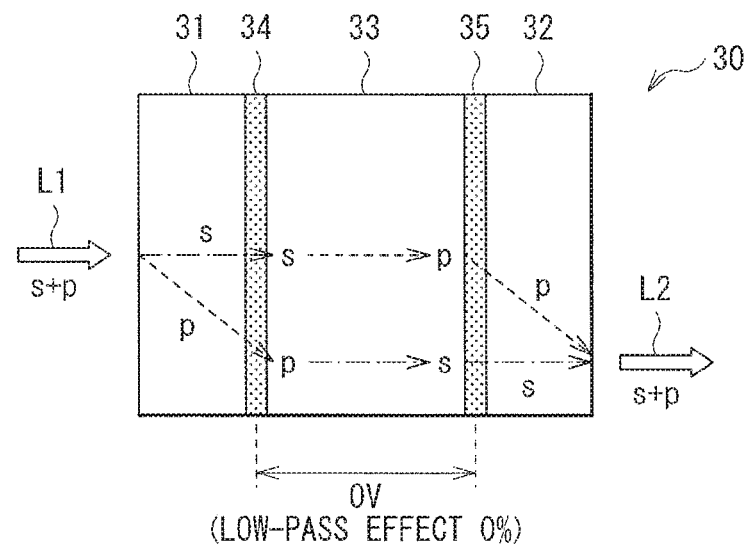

[ FIG. 5 ]
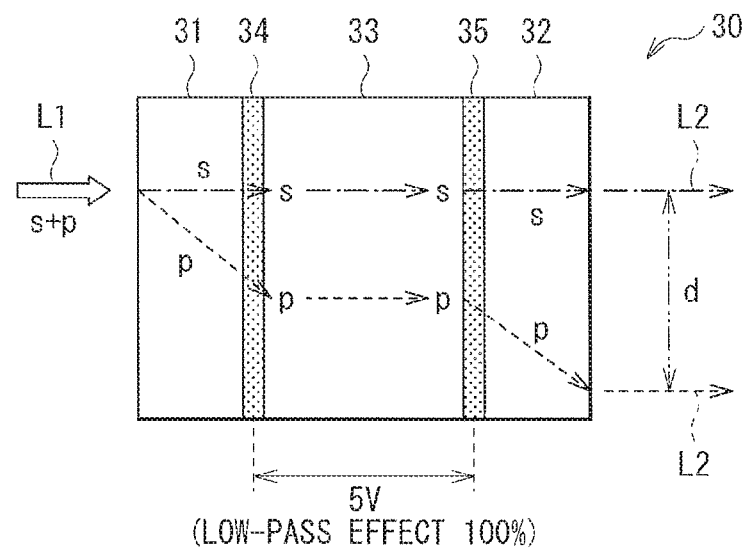
[ FIG. 6 ]
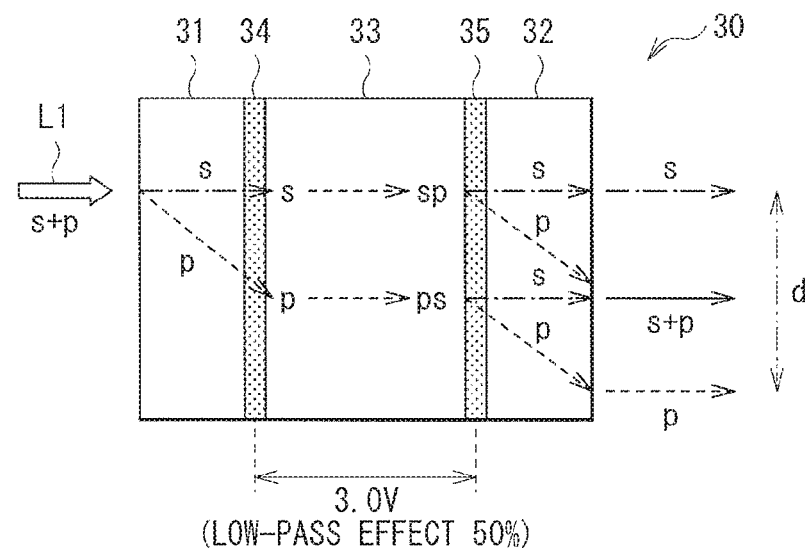

[ FIG. 7 ]
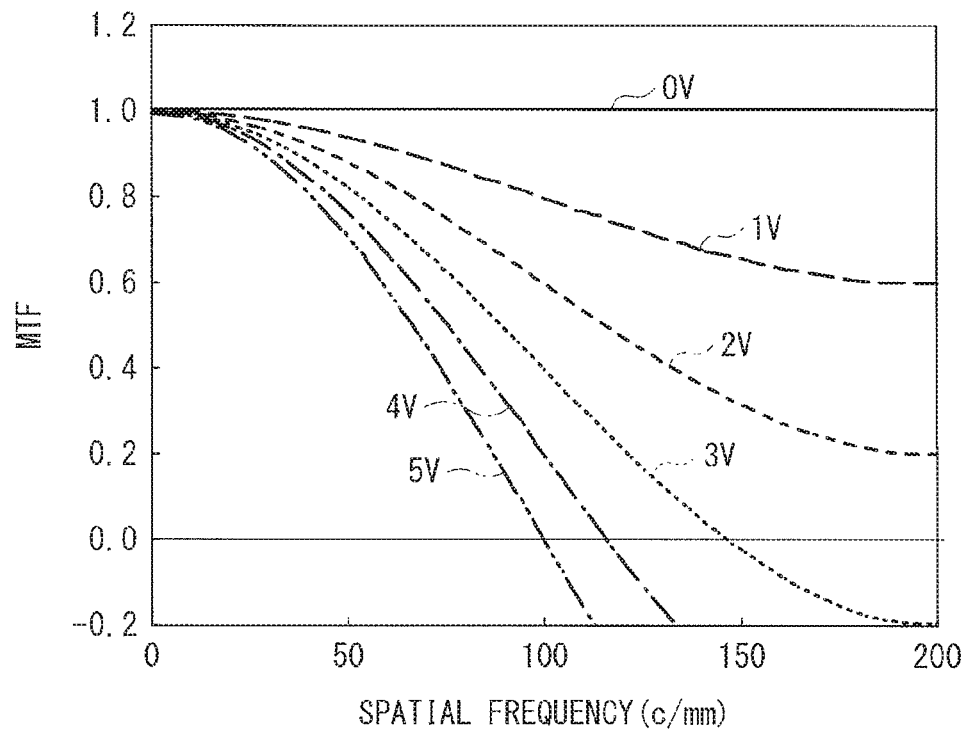
[ FIG. 8 ]
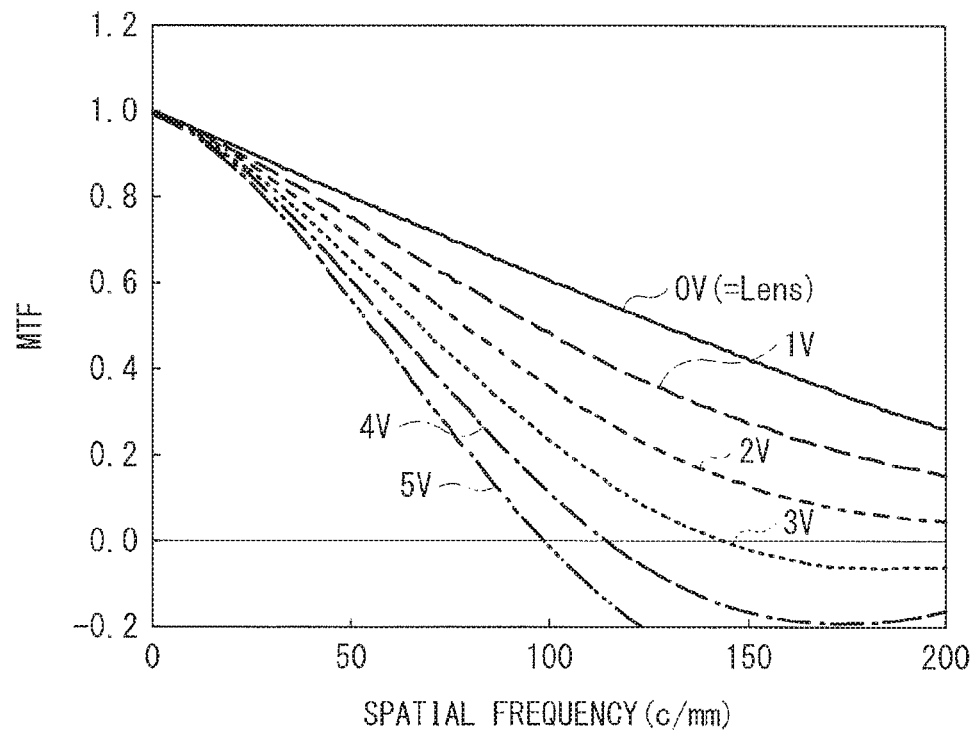

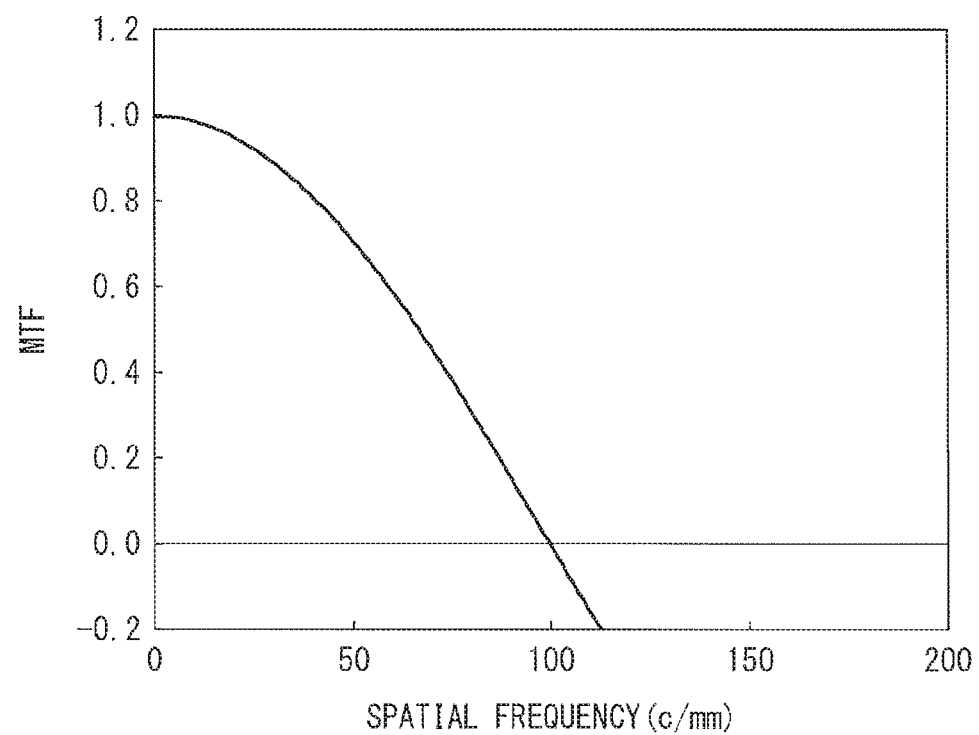
[FIG. 9]

[ FIG. 10 ]
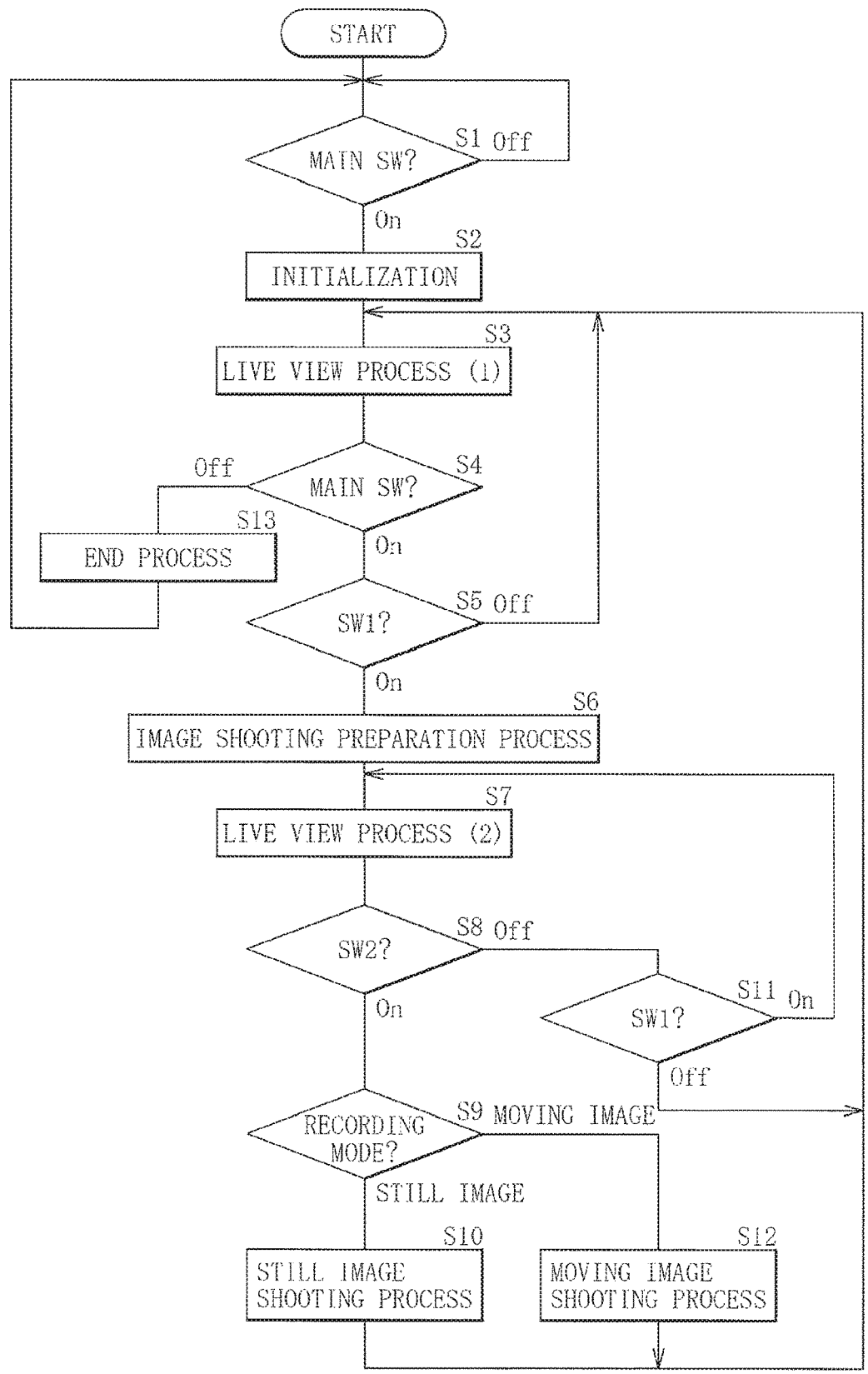

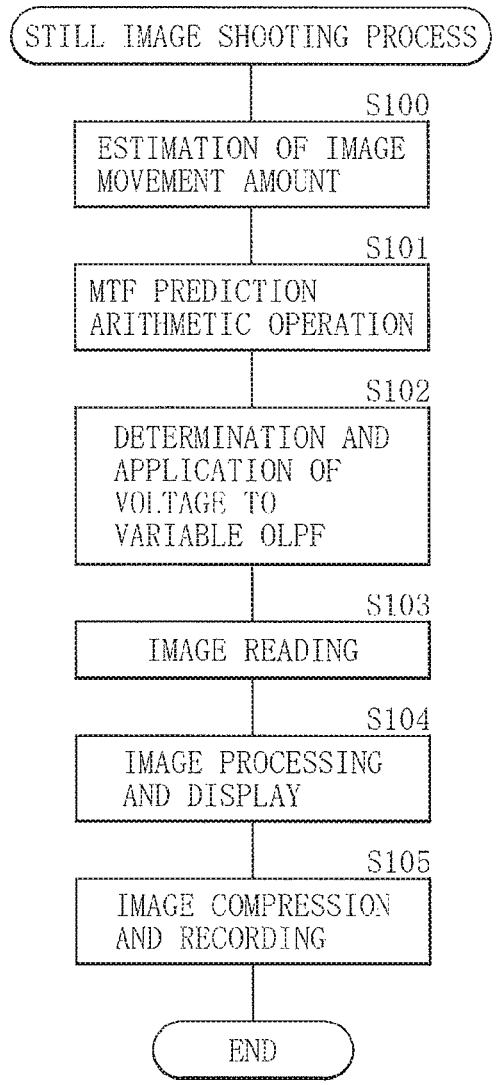
[ FIG. 11 ]

[ FIG. 12 ]
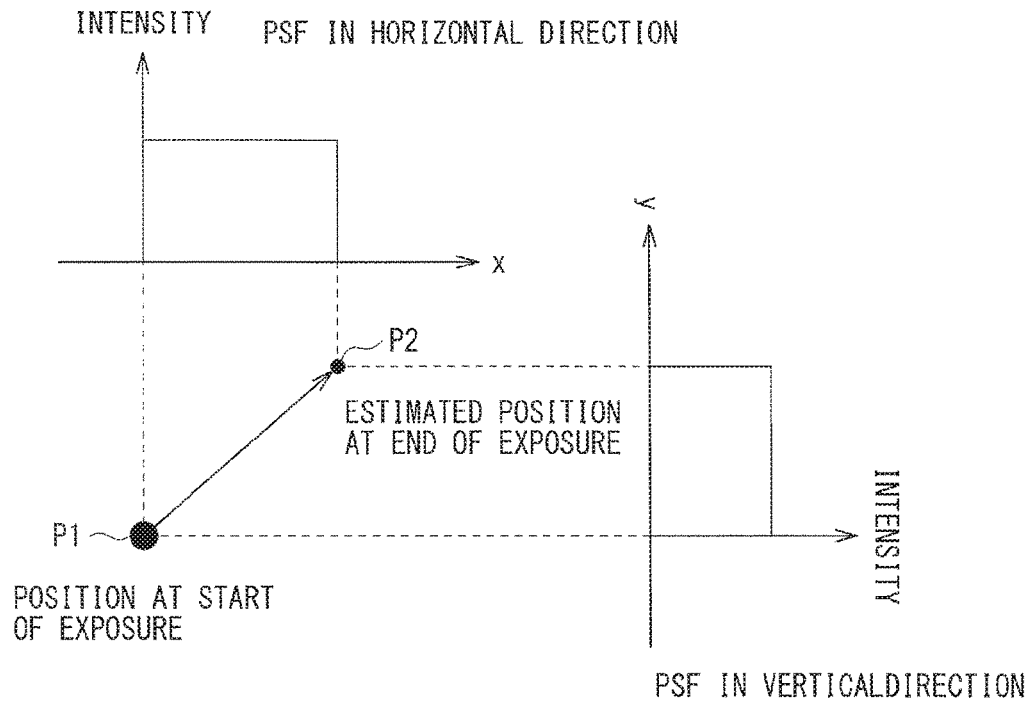
[ FIG. 13 ]
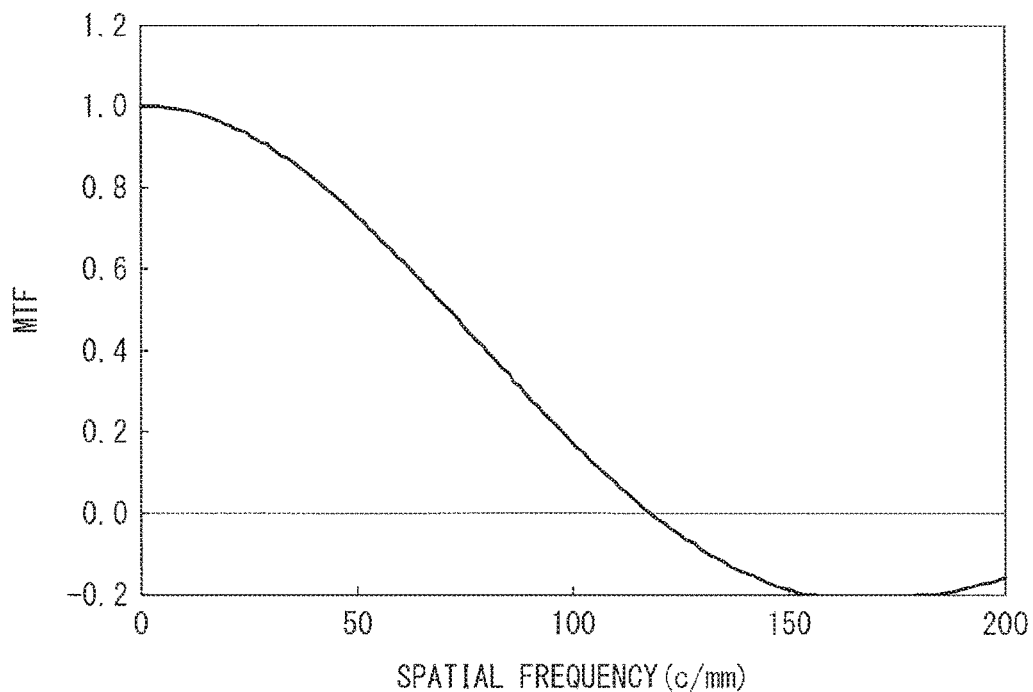

[ FIG. 14 ]
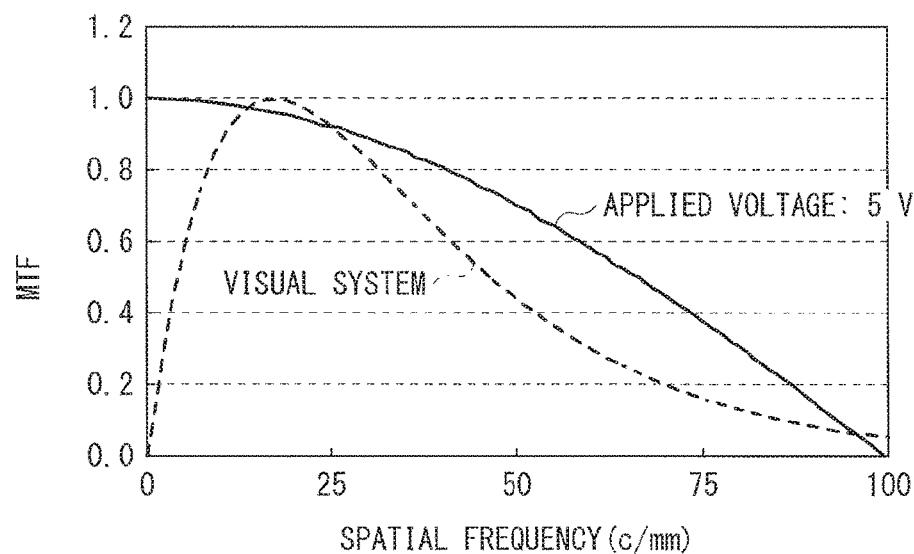
[ FIG. 15 ]
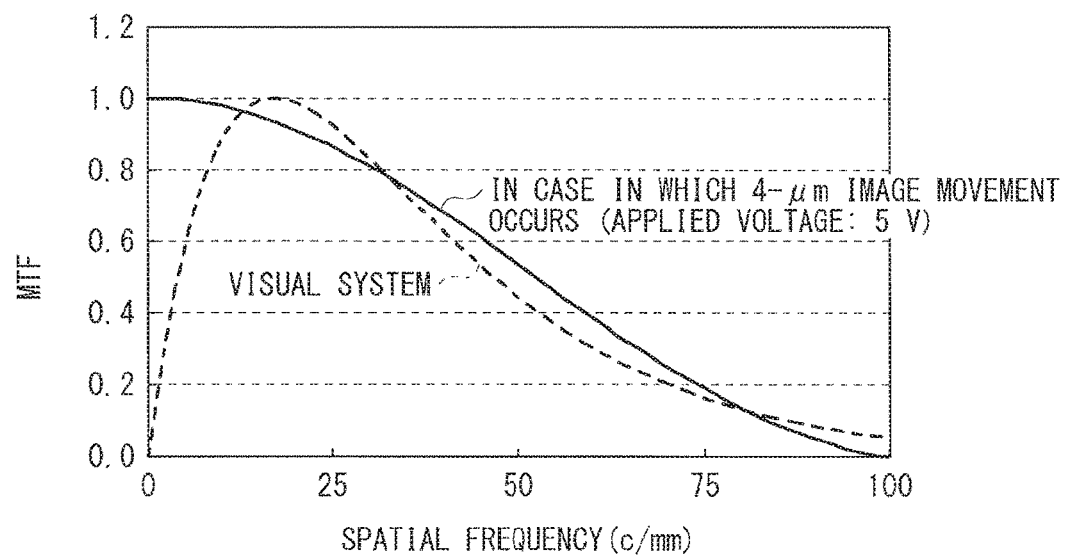

[ FIG. 16 ]
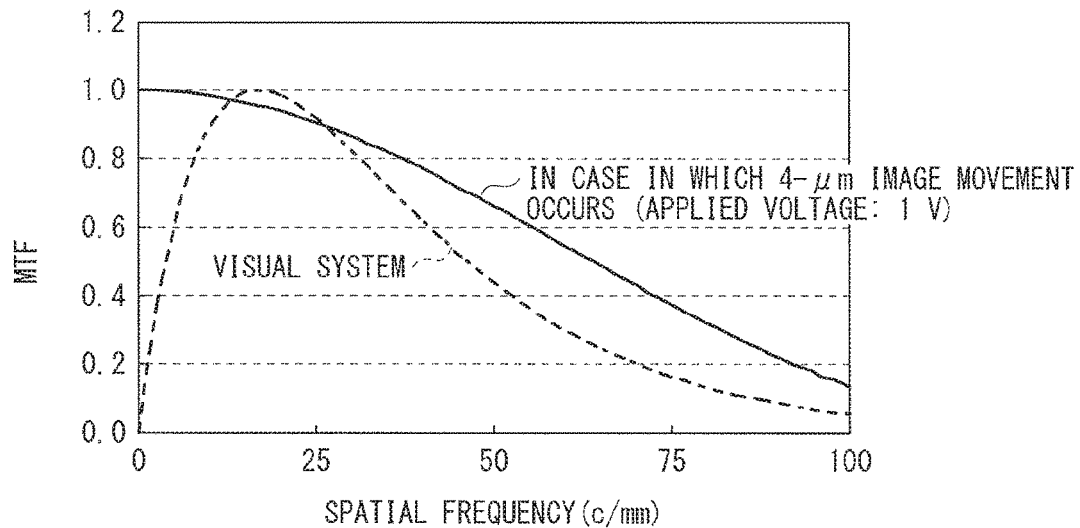
[ FIG. 17 ]
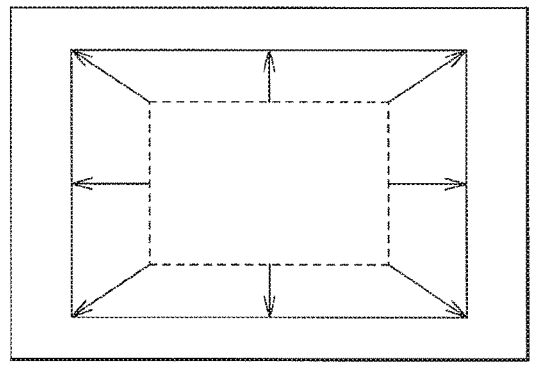
[ FIG. 18 ]
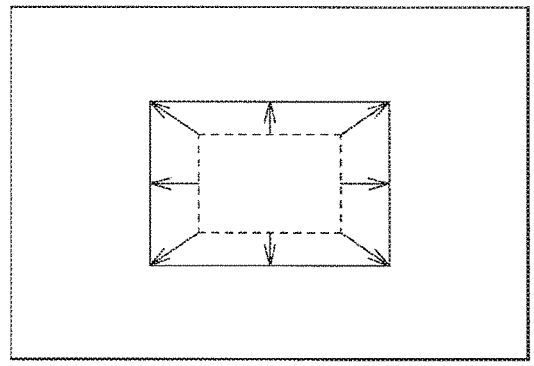

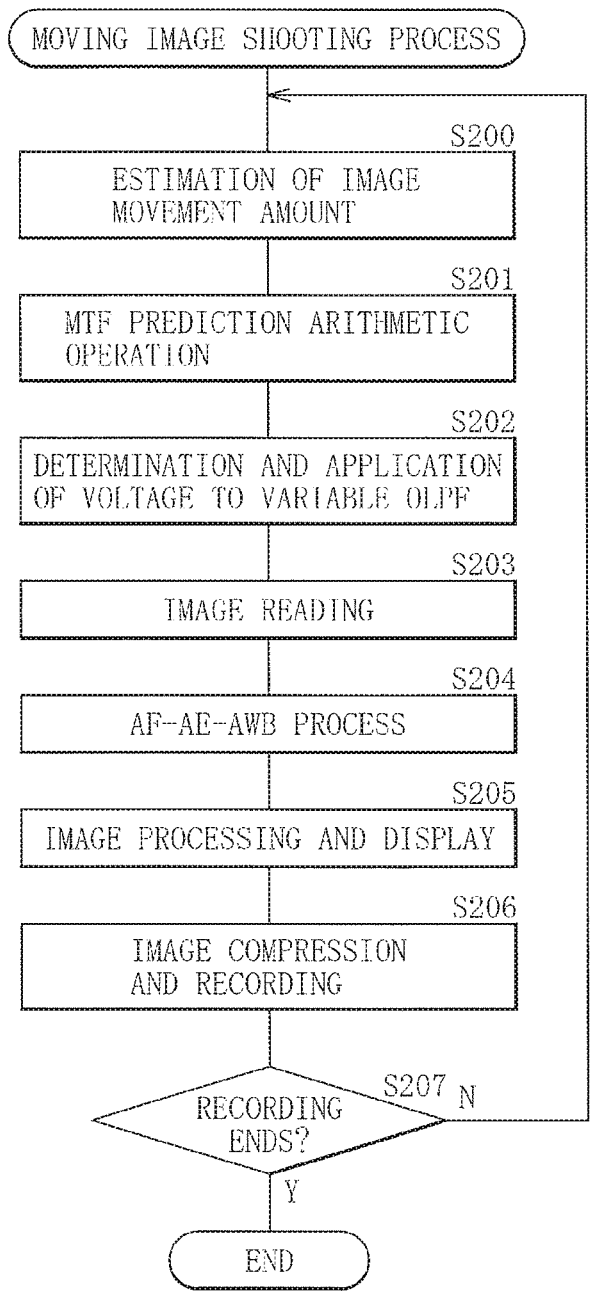
[ FIG. 19 ]

[ FIG. 20 ]
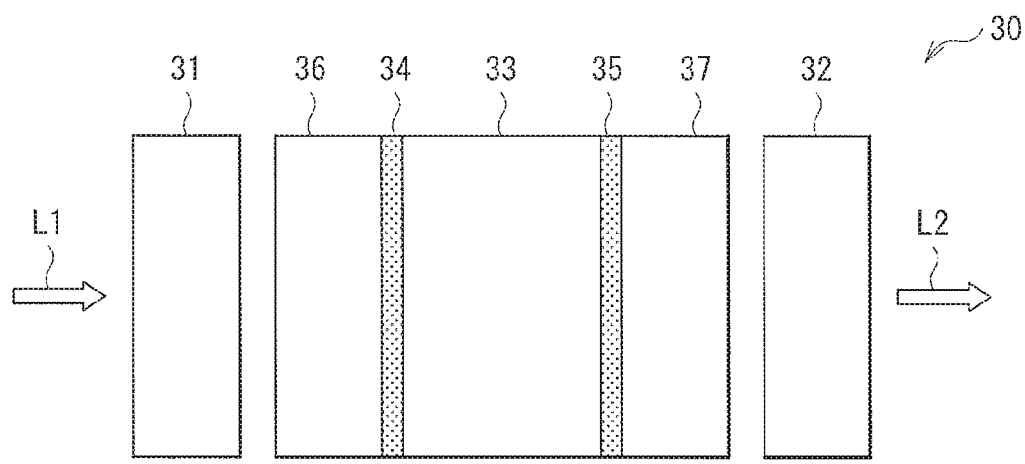

FILTER CONTROL DEVICE, FILTER CONTROLLING METHOD, AND IMAGING DEVICE

CROSS REFERENCE TO RELATED APPLICATIONS

This application is a U.S. National Phase of International Patent Application No. PCT/JP2015/068148 filed on Jun. 24, 2015, which claims priority benefit of Japanese Patent Application No. JP 2014-140151 filed in the Japan Patent Office on Jul. 8, 2014. Each of the above-referenced applications is hereby incorporated herein by reference in its entirety.

TECHNICAL FIELD

The present disclosure relates to a filter control device and a filter controlling method that are suitable for an imaging device (camera) shooting a still image or a moving image, and an imaging device.

BACKGROUND ART

In order to avoid a false signal caused by aliasing that results from sampling during imaging, a digital camera generally includes an optical low-pass filter (OLPF) (refer to Patent Literatures 1 and 2).

CITATION LIST

Patent Literature

Patent Literature 1: Japanese Unexamined Patent Application Publication No. 2013-156379
Patent Literature 2: Japanese Unexamined Patent Application Publication No. 2013-190603

DISCLOSURE OF INVENTION

A typical optical low-pass filter is allowed to have only one kind of low-pass characteristics that are determined at design time, and is designed to set an MTF to zero around a frequency corresponding to a pixel pitch of an imaging element. However, in a case in which a relative position or an angle between a subject and a camera is changed during exposure by, for example, hand movement or a panning operation by a user, image blurring (movement) corresponding to such a change occurs to change MTF characteristics of an image to be recorded. Such a change in the MTF caused by the image blurring exhibits low-pass characteristics that reduce the MTF at a high frequency, as with an optical low-pass filter. Accordingly, in a case in which image blurring occurs, a low-pass effect is doubly exerted by the optical low-pass filter and the image blurring, which may cause the low-pass effect to be exerted more than necessary in some cases. In such a case, sharpness of an image is degraded more than necessary to cause degradation in image quality.

Moreover, there is known a technology in which mechanical switching is performed between insertion and non-insertion of the optical low-pass filter in an optical path. However, in this method, only two states, i.e., a state with a low-pass effect and a state without a low-pass effect are applicable, and it is difficult for the method to sufficiently cope with image blurring causing continuous change in the MTF depending on conditions. In addition, since recording is continuously performed during moving image shooting, in a case in which image blurring changes during image shooting, switching of the optical low-pass filter is not allowed, and it is difficult for this method to cope with the above issue.

In contrast, there is known a technology of a variable optical low-pass filter that is allowed to continuously change a low-pass effect. There is known a technology to optimize low-pass characteristics for each of cases with different pixel pitches such as still image shooting, moving image shooting, and live viewing by changing a low-pass effect for each of the cases with use of such a variable optical low-pass filter. However, measures are not taken against the above-described change in the MTF caused by image blurring. Accordingly, in a case in which image blurring occurs to doubly exert the low-pass effect, degradation in image quality caused by excessive reduction in the MTF occurs.

It is therefore desirable to provide a filter control device and a filter controlling method that make it possible to achieve an image with high image quality, and an imaging element.

A filter control device according to an embodiment of the present disclosure includes a filter controller that performs control to cause low-pass characteristics of an optical low-pass filter mounted in an imaging device to be changed in accordance with change in an image shooting range.

A filter controlling method according to an embodiment of the present disclosure includes performing control to cause low-pass characteristics of an optical low-pass filter mounted in an imaging device to be changed in accordance with change in an image shooting range.

An imaging device according to an embodiment of the present disclosure includes: an optical low-pass filter; and a filter controller that performs control to cause low-pass characteristics of the optical low-pass filter to be changed in accordance with change in an image shooting range.

In the filter control device, the filter controlling method, or the imaging device according to the embodiment of the present disclosure, when change in the image shooting range occurs, the low-pass characteristics of the optical low-pass filter are changed in accordance with the change in the image shooting range.

According to the filter control device, the filter controlling method, or the imaging device according to the embodiment of the present disclosure, the low-pass characteristics of the optical low-pass filter are changed in accordance with change in the image shooting range, which makes it possible to achieve an image with high image quality.

Note that effects described here are non-limiting, and may be one or more of effects described in the present disclosure.

BRIEF DESCRIPTION OF DRAWINGS

FIG. 1 is a block diagram illustrating a configuration example of a camera (an imaging device) including a filter control device according to an embodiment of the present disclosure.

FIG. 2 is a block diagram illustrating a configuration example of an external device that processes Raw data.

FIG. 3 is a cross-sectional view of a configuration example of a variable optical low-pass filter.

FIG. 4 is an illustration of an example of a state in which a low-pass effect of the variable optical low-pass filter illustrated in FIG. 3 is 0%.

FIG. 5 is an illustration of an example of a state in which the low-pass effect of the variable optical low-pass filter illustrated in FIG. 3 is 100%.

FIG. 6 is an illustration of an example of a state in which the low-pass effect of the variable optical low-pass filter illustrated in FIG. 3 is 50%.

FIG. 7 is a characteristic diagram illustrating an example of change in MTF characteristics by an applied voltage to the variable optical low-pass filter illustrated in FIG. 3.

FIG. 8 is a characteristic diagram illustrating an example of change in MTF characteristics by an applied voltage in a case in which an imaging lens is combined with the variable optical low-pass filter illustrated in FIG. 3.

FIG. 9 is a characteristic diagram illustrating an example of MTF characteristics of a typical optical low-pass filter.

FIG. 10 is a flowchart illustrating an example of a flow of entire control of the camera.

FIG. 11 is a flowchart illustrating an example of a flow of control in a still image shooting process.

FIG. 12 is an illustration of an example of estimation of image blurring (movement) and an example of a point spread function (PSF) corresponding thereto.

FIG. 13 is a characteristic diagram illustrating an example of MTF characteristics by image blurring.

FIG. 14 is a characteristic diagram illustrating an example of MTF characteristics of a visual system and MTF characteristics of the variable low-pass filter.

FIG. 15 is a characteristic diagram illustrating an example of MTF characteristics of the visual system and MTF characteristics in a case in which 4-µm image movement occurs.

FIG. 16 is a characteristic diagram illustrating an example of MTF characteristics of the visual system and MTF characteristics in a case in which a low-pass effect of the variable optical low-pass filter is changed in accordance with 4-µm image movement.

FIG. 17 is an illustration of an example of image movement by zooming.

FIG. 18 is an illustration of another example of image movement by zooming.

FIG. 19 is a flowchart illustrating an example of a flow of control in a moving image shooting process.

FIG. 20 is a cross-sectional view of another configuration example of the variable optical low-pass filter.

MODES FOR CARRYING OUT THE INVENTION

In the following, some embodiments of the present disclosure are described in detail with reference to the drawings. It is to be noted that description is given in the following order.
<1. Configuration>
[1.1 Configuration Example of Camera (Imaging Device)] (FIG. 1)
[1.2 Configuration Example of External Device Processing Raw Data] (FIG. 2)
[1.3 Configuration and Principle of Variable Optical Low-pass Filter] (FIGS. 3 to 6)
[1.4 MTF Characteristics of Variable Optical Low-pass Filter] (FIGS. 7 to 9)
<2. Operation>
[2.1 Entire Control Operation of Camera] (FIG. 10)
[2.2 Still Image shooting Process] (FIG. 11 and FIGS. 12 to 18)
[2.3 Moving Image shooting Process] (FIG. 19)
<3. Effects>
<4. Other Embodiments>
   <1. Configuration>
[1.1 Configuration Example of Camera (Imaging Device)]
FIG. 1 illustrates a configuration example of a camera (an imaging device) 100 including a filter control device according to an embodiment of the present disclosure. The camera 100 includes an imaging optical system 1, a lens controller 4, a variable optical low-pass filter controller (OLPF controller) 5, an imaging element 6, and an image processor 7. The camera 100 further includes a display panel 11, a recording medium 12, a control microcomputer 13, a vertical movement speed-pitch rotation angular speed detector 15, a horizontal movement speed-yaw rotation angular speed detector 16, and an operation section 20.

The imaging optical system 1 includes an imaging lens 1A and a variable optical low-pass filter (a variable OLPF) 30. The imaging lens 1A is adapted to form an optical subject image on the imaging element 6. The imaging lens 1A includes a plurality of lenses, and enables optical focus adjustment and zoom adjustment by moving one or more of the lenses. The variable optical low-pass filter 30 may be built in the image optical system 1, or may be mounted by a user as an exchangeable filter. The lens controller 4 is adapted to drive one or more of the lenses in the imaging lens 1A for optical zoom magnification, focus adjustment, and other adjustment. The imaging element 6 is adapted to convert the subject image formed on a light reception surface through the imaging lens 1A and the variable optical low-pass filter 30 into an electrical signal by photoelectric conversion to generate image data. The imaging element 6 may be configured of, for example, a CCD (Charge Coupled Device) or a CMOS (Complementary Metal Oxide Semiconductor) image sensor.

The image processor 7 is adapted to perform image processing on the image data read from the imaging element 6. Non-limiting examples of the image processing may include white balance, demosaicing, grayscale conversion, color conversion, and noise reduction.

The image processor 7 is adapted to perform processing such as conversion of image data into display data suitable for display on the display panel 11 and conversion of image data into data suitable for recording on the recording medium 12.

The image processor 7 may further perform, by image processing, an electronic zoom process in which a magnification of a shot image is changed (enlarged or reduced). In a case in which the image processor 7 reduces an image, the image processor 7 performs a pixel decimation process. In a case in which the image processor 7 enlarges an image, the image processor 7 performs a pixel interpolation process.

The display panel 11 may be configured of, for example, a liquid crystal panel, and has a function as a display section that displays a live view image. In addition thereto, a device setting menu or a user operation state may be displayed on the display panel 11. Further, various kinds of image shooting data such as image shooting conditions may be displayed.

The recording medium 12 is adapted to hold shot image data. In general, the image processor 7 records compressed image data such as JPEG as image data to be recorded on the recording medium 12. In addition thereto, so-called Raw data may be recorded on the recording medium 12.

The operation section 20 includes a main switch (main SW), a shutter button 21, a focus adjustment operation section 23, and a zoom operation section 24. The operation section 20 further includes a switch SW1 and a switch SW2 that are each turned on in response to a pressing amount of the shutter button 21.

The zoom operation section 24 enables manual zooming. The focus adjustment operation section 23 enables manual focus adjustment, and may be, for example, a focus adjustment ring provided to a lens barrel of the imaging lens 1A.

The variable optical low-pass filter 30 includes a first variable optical low-pass filter 2 and a second variable optical low-pass filter 3. In a case in which the variable optical low-pass filter 30 is of a type that controls low-pass characteristics in a specific one-dimensional direction, using two variable optical low-pass filters 30 (the first variable optical low-pass filter 2 and the second variable optical low-pass filter 3) makes it possible to control low-pass characteristics both in a horizontal direction and in a vertical direction, as will be described later.

The control microcomputer 13 is adapted to perform centralized control of respective circuit blocks. The OLPF controller 5 is adapted to control low-pass characteristics of the variable optical low-pass filter 30 in accordance with an instruction from the operation section 20 or the control microcomputer 13.

The vertical movement speed-pitch rotation angular speed detector 15 may include, for example, an acceleration sensor and an angular speed sensor, and is adapted to detect movement speed and angular speed in the vertical direction of the camera 100 when hand movement or an panning operation takes place. The horizontal movement speed-yaw rotation angular speed detector 16 may include, for example, an acceleration sensor and an angular speed sensor, and is adapted to detect movement speed and angular speed in the horizontal direction of the camera 100 when hand movement or a panning operation takes place. The control microcomputer 13 may calculate an image movement amount on an image plane (on the imaging element 6) in a case in which hand movement or a panning operation takes place on the basis of detection results of the vertical movement speed-pitch rotation angular speed detector 15 and the horizontal movement speed-yaw rotation angular speed detector 16.

In a case in which change in an image shooting range occurs, the control microcomputer 13 and the OLPF controller 5 perform control to change low-pass characteristics of the variable optical low-pass filter 30 in accordance with the change in the image shooting range, as will be described later. For example, when the image shooting range is changed, the control microcomputer 13 and the OLPF controller 5 may perform control to cause the low-pass characteristics of the variable optical low-pass filter 30 to be weaker than when the image shooting range is not changed. The change in the image shooting range may be, for example, image movement on the image plane caused by change in one or both of a relative position and an angle between a subject and the camera 100. Moreover, the change in the image shooting range may be, for example, change in image magnification on the image plane by zooming. Further, the change in the image shooting range may be, for example, image movement on the image plane by hand movement of the camera 100 or a panning operation.

For example, the control microcomputer 13 and the OLPF controller 5 may predict a change amount of MTF characteristics on the basis of a change amount of the image shooting range, and may change the low-pass characteristics of the variable optical low-pass filter 30 so as to compensate for change in the MTF characteristics. Alternatively, for example, the control microcomputer 13 and the OLPF controller 5 may predict a change amount of sharpness on the basis of the change amount of the image shooting range, and may change the low-pass characteristics of the variable optical low-pass filter 30 so as to compensate for the change amount of sharpness. A change amount by the change in the image shooting range may be determined on the basis of change amounts of the relative position and the angle between the subject and the camera 100, a focal length of the imaging lens 1A, a focus extending amount of the imaging lens 1A, and exposure time.

[1.2 Configuration Example of External Device Processing Raw Data]

FIG. 2 illustrates a configuration example of an external device 103 that processes Raw data. FIG. 1 illustrates a configuration in which various kinds of image processing are performed on image data in the camera 100; however, the camera 100 may include a Raw data recorder 109, as illustrated in FIG. 2. Data indicating low-pass characteristics at the time of image shooting may be recorded as metadata 102 together with Raw data 101, and the external device 103 may perform image processing. A function of image processing in the external device 103 may be achieved by an application on a PC (personal computer), for example. It is to be noted that, in the camera 100, processes to be performed in the image processor 7 are not applied when the Raw data is recorded (a signal passes through).

The external device 103 includes an image processor 104. The image processor 104 basically has the same process function as the image processor 7 in the camera 100 in FIG. 1. Image data processed by the external device 103 is recorded as an output file 108.

In related art, a means of embedding various kinds of metadata in the Raw data 101 is known, but data indicating the low-pass characteristics of the variable optical low-pass filter 30 is not recorded. According to the present embodiment, it is possible to record data indicating the low-pass characteristics as metadata.

[1.3 Configuration and Principle of Variable Optical Low-Pass Filter]

The configuration and principle of the variable optical low-pass filter 30 are described more specifically with reference to FIGS. 3 to 6.

(Configuration Example of Variable Optical Low-Pass Filter 30)

FIG. 3 illustrates a configuration example of the variable optical low-pass filter 30. The variable optical low-pass filter 30 includes a first birefringent plate 31, a second birefringent plate 32, a liquid crystal layer 33, a first electrode 34, and a second electrode 35. The variable optical low-pass filter 30 has a configuration in which the liquid crystal layer 33 is interposed between the first electrode 34 and the second electrode 35 and is further interposed from outside between the first birefringent plate 31 and the second birefringent plate 32. The first electrode 34 and the second electrode 35 are adapted to apply an electrical field to the liquid crystal layer 33. It is to be noted that the variable optical low-pass filter 30 may further include, for example, an alignment film that controls alignment of the liquid crystal layer 33. Each of the first electrode 34 and the second electrode 35 is configured of one sheet-like transparent electrode. It is to be noted that one of the first electrode 34 and the second electrode 35 or both may be configured of a plurality of partial electrodes.

The first birefringent plate 31 is disposed on light incident side of the variable optical low-pass filter 30, and an outer surface of the first birefringent plate 31 may serve as a light incident surface, for example. Incident light L1 is light that enters the light incident surface from subject side. The second birefringent plate 32 is disposed on light exit side of the variable optical low-pass filter 30, and an outer surface of the second birefringent plate 32 may serve as a light exit surface, for example. Transmission light L2 of the variable optical low-pass filter 30 is light that exits from the light exit surface to outside.

Each of the first birefringent plate 31 and the second birefringent plate 32 has birefringence, and has a uniaxial crystal structure. Each of the first birefringent plate 31 and the second birefringent plate 32 has a function of performing ps separation of circularly polarized light with use of birefringence. Each of the first birefringent plate 31 and the second birefringent plate 32 may be made of, for example, crystal, calcite, or lithium niobate.

The liquid crystal layer 33 may be made of, for example, a TN (Twisted Nematic) liquid crystal. The TN liquid crystal has optical activity causing the polarization direction of light passing therethrough to be rotated along rotation of the nematic liquid crystal.

Since the basic configuration in FIG. 3 makes it possible to control the low-pass characteristics in the specific one-dimensional direction, in the present embodiment, two variable optical low-pass filters 30 in FIG. 3 serving as the first variable optical low-pass filter 2 and the second variable optical low-pass filter 3 are mounted to control the low-pass characteristics in the horizontal direction and the vertical direction.

(Principle of Variable Optical Low-Pass Filter 30)

Description is given of the principle of the variable optical low-pass filter 30 with reference to FIGS. 4 to 6. FIG. 4 illustrates an example of a state in which a low-pass effect of the variable optical low-pass filter illustrated in FIG. 3 is 0%. FIG. 5 illustrates an example of a state in which the low-pass effect is 100%. FIG. 6 illustrates an example of a state in which the low-pass effect is 50%. It is to be noted that FIGS. 4 to 6 each illustrate an example in a case in which an optical axis of the first birefringent plate 31 is parallel to an optical axis of the second birefringent plate 32. Moreover, a voltage value illustrated in each of FIGS. 4 to 6 is an example, and is not limited thereto. The same applies to numerical values such as a voltage value illustrated in other following drawings.

In the variable optical low-pass filter 30, it is possible to control a polarization state of light to continuously change low-pass characteristics. In the variable optical low-pass filter 30, changing an electrical filed to be applied to the liquid crystal layer 33 (an applied voltage between the first electrode 34 and the second electrode 35) makes it possible to control the low-pass characteristics. For example, the low-pass effect is zero (equivalent to passing through) in a state in which the applied voltage is 0 V as illustrated in FIG. 4, and the low-pass effect is at the maximum (100%) in a state in which 5 V is applied as illustrated in FIG. 5. Moreover, the low-pass effect is in an intermediate state (50%) in a state in which 3 V is applied as illustrated in FIG. 6. Characteristics when the low-pass effect is at the maximum are determined by characteristics of the first birefringent plate 31 and the second birefringent plate 32.

In the respective states in FIGS. 4 to 6, the incident light L1 is separated by the first birefringent plate 31 into an s-polarized component and a p-polarized component.

In the state illustrated in FIG. 4, optical rotation in the liquid crystal layer 33 is 90°, which causes the s-polarized component and the p-polarized component to be respectively converted into a p-polarized component and an s-polarized component in the liquid crystal layer 33. Thereafter, the second birefringent plate 32 combines the p-polarized component and the s-polarized component into the transmission light L2. In the state illustrated in FIG. 4, a separation width d between the ultimate s-polarized component and the ultimate p-polarized component is zero, and the low-pass effect is zero accordingly.

In the state illustrated in FIG. 5, the optical rotation in the liquid crystal layer 33 is 0°, which causes the s-polarized component and the p-polarized component to pass through the liquid crystal layer 33 without being converted. Thereafter, a separation width between the p-polarized component and the s-polarized component is increased by the second birefringent plate 32. In the state illustrated in FIG. 5, the separation width d between the s-polarized component and the p-polarized component in the ultimate transmission light L2 is at the maximum, and the low-pass effect is at the maximum (100%) accordingly.

In the state illustrated in FIG. 6, the optical rotation in the liquid crystal layer 33 is 45°, which causes the s-polarized component including an s-polarized component and a p-polarized component to pass through the liquid crystal layer 33, and thereafter be separated into an s-polarized component and a p-polarized component by the second birefringent plate 32. Likewise, the p-polarized component including an s-polarized component and a p-polarized component is caused to pass through the liquid crystal layer 33, and thereafter be separated into an s-polarized component and a p-polarized component by the second birefringent plate 32. The ultimate transmission light L2 includes the s-polarized component and the p-polarized component separated by the separation width d, and a combined component of the p-polarized component and the s-polarized component, and the low-pass effect is in an intermediate state (50%).

[1.4 MTF Characteristics of Variable Optical Low-Pass Filter]

FIG. 7 illustrates an example of change in MTF characteristics in a case in which a voltage to be applied to the variable optical low-pass filter 30 is changed. In FIG. 7, a horizontal axis indicates spatial frequency (c/mm (cycle/mm)) and a vertical axis indicates an MTF value. The same applies to the following other drawings indicating MTF characteristics.

FIG. 8 illustrates an example of change in MTF characteristics by an applied voltage in a case in which the variable optical low-pass filter 30 illustrated in FIG. 3 is combined with the imaging lens 1A. The MTF characteristics at 0 V are in a passing-through state without a low-pass effect, and are completely the MTF characteristics of the imaging lens 1A.

FIG. 9 illustrates an example of the MTF characteristics of a typical optical low-pass filter. In this case, only specific low-pass characteristics determined at design time are provided.

<2. Operation>

[2.1 Entire Control Operation of Camera]

FIG. 10 illustrates an example of a flow of entire control of the camera. The control microcomputer 13 performs processes in step S1 to step S13 illustrated in FIG. 10 as an entire control process of the camera by itself or by controlling other circuit blocks.

After starting up the camera 100, the control microcomputer 13 determines a state of the main switch (main SW) in the step S1. When the main switch is in an on state, the process goes to step S2, and when the main switch is in an off state, determination of the state of the switch is repeated. In the step S2, necessary initialization is performed.

In step S3, the control microcomputer 13 performs control for displaying of a live view image. First, the control microcomputer 13 reads live view image data from the imaging element 6, and performs an exposure arithmetic operation (AE) and a white balance arithmetic operation (AWB) on the basis of the read image data. The control microcomputer 13 determines an f number to be set to the lens controller 4 and shutter speed to be set to the imaging element 6 from a result of the exposure arithmetic operation to appropriately control exposure (this result is reflected from an image to be next read). A white balance gain determined by the white balance arithmetic operation is applied to the next image processing stage. After the image processor 7 performs appropriate processing on the read image data, the image data is outputted to the display panel 11 to display the live view image. The image processing includes processes such as white balance, demosaicing, grayscale conversion, color conversion, and noise reduction, all of which are general processes for a digital camera, and are not described here.

In step S4, the control microcomputer 13 determines the state of the main SW again. When the main SW is still in the on state, the process goes to the next step S5. When the main SW is in the off state, the process goes to step S13, and an end process is performed to turn the camera 100 to a standby state, and thereafter, the process returns to the step S1.

In the step S5, the control microcomputer 13 detects the state of the switch SW1 that is turned to the on state in a state in which the shutter button 21 is pressed halfway, and when the switch SW1 is in the on state, the process goes to an image shooting preparation operation in step S6. When the switch SW1 is not in the on state, the process returns to the step S3, and the live view process (1) is repeated.

In the step S6, the control microcomputer 13 performs a necessary preparation process for image shooting. In the present embodiment, description is given of only a focus adjustment process by automatic focusing that is a main process herein. The control microcomputer 13 provides a predetermined instruction to the lens controller 4, and repeats reading of an image while continuously changing a focus position of the imaging lens 1A. The control microcomputer 13 calculates a contrast evaluation value of the subject from read image data to determine a position where the evaluation value is at the maximum, and fixes the focus position of the lens to the determined position. This is a typical contrast AF (autofocus) system in a digital camera.

In step S7, the control microcomputer 13 performs a process similar to that in the step S3 to display the live view image again. The process is different from that in the step S3 in that an exposure arithmetic operation is not performed here in order to fix exposure in a state in which the switch SW1 is in the on state.

In step S8, the control microcomputer 13 determines whether the switch SW2 is in the on state or in the off state. The switch SW2 detects that shutter button 21 is pressed. When the switch SW2 is in the on state, the process by the control microcomputer 13 goes to an image shooting operation in step S9 and later steps. When the switch SW2 is in the off state, the control microcomputer 13 determines whether the switch SW1 is turned to the off state in step S11, and when the SW1 is turned to the off state, the process is returned to the step S3, and the control microcomputer 13 repeats the live view process (1) and later processes. When the switch SW1 is still in the on state, the process is returned to the step S7, and the control microcomputer 13 repeats a live view process (2) and later processes.

In step S9, the control microcomputer 13 determines a recording mode of the camera 100. In a case in which the recording mode is a still image mode, the process by the control microcomputer 13 goes to a still image shooting process in step S10, and in a case in which the recording mode is a moving image mode, the process by the control microcomputer 13 goes to a moving image shooting process in step S12. The still image shooting process in the step S10 and the moving image shooting process in the step S12 will be described in detail later. The process returns to the step S3 after completion of both the processes, and the control microcomputer 13 repeats a sequence of the operations.

[2.2 Still Image Shooting Process]

FIG. 11 illustrates an example of a flow of the still image shooting process. The control microcomputer 13 performs processes in step S100 to S105 illustrated in FIG. 11 as the still image shooting process by itself or by controlling other circuit blocks.

In FIG. 11, the control microcomputer 13 first estimates an image movement amount caused during exposure by movement or rotation of the camera 100 in the step 100. Such a process is described below.

The control microcomputer 13 first obtains movement speed and angular speed in the vertical direction and the horizontal direction from the vertical movement speed-pitch rotation angular speed detector 15 and the horizontal movement speed-yaw rotation angular speed detector 16. Details of a method of detecting the movement speed and the angular speed from the acceleration sensor and the angular speed sensor are known in technologies such as a technology of hand movement correction, and are not described here.

Next, the control microcomputer 13 estimates an image movement amount in the horizontal direction. A position change $\Delta pH$ caused during exposure time t[s] when the position of the camera 100 is changed in the horizontal direction at speed VH by hand movement or a panning operation is estimated by the following expression.

$$\Delta pH = VH \times t \quad \text{(Expression 1)}$$

An image movement amount $\Delta dH1$ on the image plane (on the imaging element 6) when the position of the camera 100 is changed by $\Delta pH$ is represented by the following expression, where a subject magnification at the time of image shooting is M.

$$\Delta dH1 = M \times \Delta pH \quad \text{(Expression 2)}$$

It is possible to calculate the subject magnification M by the following expression, where the focal length of the imaging lens 1A is f, and the focus extending amount of the imaging lens 1A is x'.

$$M = x'/f \quad \text{(Expression 3)}$$

Next, the control microcomputer 13 determines an estimated image movement amount $\Delta dH2$ upon angle change in the horizontal direction by the following arithmetic operation in a similar manner. An angle change $\Delta\theta H$ caused during the exposure time t[s] when the camera 100 rotates around a horizontal axis (a pitch direction) at angular speed $\omega H$ [rad/s] is estimated by the following expression.

$$\Delta\theta H = \omega H \times t \quad \text{(Expression 4)}$$

The image movement amount $\Delta dH2$ on the image plane when the angle is changed by $\Delta\theta H$ [rad] is represented by the following expression, where the focal length of the imaging lens 1A is f [mm], and the focus extending amount of the imaging lens 1A is x' [mm].

$$\Delta dH2 = (f + x') \times \tan(\Delta\theta H) \quad \text{(Expression 5)}$$

The control microcomputer 13 determines an estimated total image movement amount $\Delta dH$ in the horizontal direction by adding up the estimated image movement amounts $\Delta dH1$ and $\Delta dH2$ that are determined as above and are caused by movement and angle change.

$$\Delta dH = \Delta dH1 + \Delta dH2 \quad \text{(Expression 6)}$$

The control microcomputer 13 determines an estimated image movement amount $\Delta dV1$ caused by movement in the vertical direction and an estimated image movement amount ΔdV2 caused by rotation in a similar manner, and determines an estimated total image movement amount ΔdV in the vertical direction by the following expression.

$$\Delta dV = \Delta dV1 + \Delta dV2 \quad \text{(Expression 7)}$$

Next, in step 101, the control microcomputer 13 estimates change in an MTF caused by image movement on the basis of the determined estimated image movement amounts. In a case in which movement by ΔdH occurs in the horizontal direction with constant speed during exposure, a point spread function (PSF) that determines the MTF may be a rectangular function illustrated in FIG. 12, for example.

FIG. 12 illustrates an example of estimation of image blurring (movement) and an example of a point spread function (PSF) corresponding thereto. In FIG. 12, a position at the start of exposure is P1, and an estimated position at the end of the exposure is P2. The control microcomputer 13 may perform estimation, assuming that an image makes uniform linear motion at the movement speed and the rotation angular speed of the camera 100 at the start of the exposure, for example. FIG. 13 illustrates MTF characteristics by image blurring, which correspond to a result of a Fourier transform of the PSF illustrated in FIG. 12.

In order to determine the MTF, it is only necessary to perform a Fourier transform of the PSF. Since a Fourier transform of a rectangular function is a sync function represented by the following expression, it is possible to determine MTF characteristics MtfH(u) with respect to a spatial frequency u in the horizontal direction from the estimated image movement amount by the following expression.

$$MtfH(u) = \sin(2\pi \times \Delta dH \times u)/(2\pi \times \Delta dH \times u) \quad \text{(Expression 8)}$$

Next, the control microcomputer 13 determines MTF characteristics MtfV(v) with respect to a spatial frequency v in the vertical direction from the estimated image movement amount ΔdV in the vertical direction by the following expression in a similar manner.

$$MtfV(u) = \sin(2\pi \times \Delta dV \times u)/(2\pi \times \Delta dV \times u) \quad \text{(Expression 9)}$$

Thereafter, in step 102, the control microcomputer 13 determines a voltage to be applied to the variable optical low-pass filter 30 from the MTF characteristics determined in the step 101, and provides an instruction to the OLPF controller 5 to apply the determined voltage to the variable optical low-pass filter 30. The applied voltage is determined as follows.

The control microcomputer 13 first determines what percent MTFs in horizontal direction and the vertical direction at a frequency that is 80% of a Nyquist frequency are respectively of the MTFs in the horizontal direction and the vertical direction that are determined in the step 101. The Nyquist frequency is determined by a pixel pitch of the imaging element 6. For example, in a case in which the pixel pitch is 5 μm, the Nyquist frequency is 100 c/mm; therefore, MTFs at 80 c/mm are determined. As long as image blurring does not occur at all, the MTFs are not reduced, and are 100% accordingly. However, in a case in which image blurring occurs, for example, a value such as 40% is determined.

In a case in which image blurring does not occur, the control microcomputer 13 applies, to the variable optical low-pass filter 30, a voltage that causes a low-pass effect to be at maximum so as not to generate a false signal by aliasing. The camera 100 holds MTF data for each of applied voltages measured in advance. Accordingly, it is possible to know an MTF at 80 c/mm when the low-pass effect is at the maximum. For example, it is assumed that the MTF at 80 c/mm when the low-pass effect is at the maximum is 30%.

The MTF is originally set to be reduced to 30%, and the reduced MTF is further reduced to 40% by image blurring; therefore, the MTF is reduced to 0.3×0.4=0.12, that is, 12% when doing nothing. Accordingly, reduction to 40% caused by image blurring is subtracted from the low-pass effect to achieve the same effect. In other words, it is only necessary to correct the MTF by the inverse of 40%, that is, 1/0.4=2.5 times. Since the original MTF by the variable optical low-pass filter 30 is 30%, 0.3×2.5 is equal to 0.75. Accordingly, an applied voltage that causes the MTF at 80 c/mm to be 75% may be determined, and the determined voltage may be applied to the variable optical low-pass filter 30 in a direction (the horizontal direction or the vertical direction) corresponding to the voltage.

Thereafter, the control microcomputer 13 reads image data from the imaging element 6 in step 103. In step 104, the read image data is subjected to processing such as white balance, demosaicing, grayscale conversion, color conversion, and noise reduction in the image processor 7, and is outputted to a liquid crystal panel 10 to be displayed on the liquid crystal panel 10.

In the step 105, the image having been subjected to the image processing is compressed by a JPEG algorithm and is recorded on the recording medium 12. At this occasion, metadata such as image shooting conditions is recorded together, and the still image shooting process is ended in the step 105.

In the present embodiment, as described in the step 100, it is assumed that a direction of movement of an image caused during exposure is approximated by a straight line, and the image moves with constant speed in a section where the image moves, as described in the step 100. Actually, the image does not move with constant speed in many cases; however, in control of the characteristics of the variable optical low-pass filter 30 that is a purpose of this matter, a variable range of the characteristics is limited; therefore, a range of image blurring as a target is relatively narrow and is caused in a short time. Accordingly, a sufficiently significant effect is achieved in the above approximation.

It goes without saying that an effective means is dividing exposure time into a plurality of sections and repeating detection and prediction to improve accuracy. Moreover, in a case in which arithmetic power is sufficient, effective techniques include estimating change by a high-order approximate expression with use of angular speed data, acceleration data, and speed data, and estimating a two-dimensional movement locus. In determination of the MTF in this case, determined PSF data is directly subjected to Fourier transform by a fast Fourier transform algorithm (FET). Moreover, another effective technique is averaging a plurality of data to avoid disturbance such as noise.

Expression 2 and Expression 5 for determination of a blurring (movement) amount on the image plane each include an approximation in part, but achieve sufficient accuracy for the purpose as mentioned above. Moreover, (f+x') in Expression 5 corresponds to a distance from a principal point on image side to an image forming point of the imaging lens 1A; therefore, instead of the focal length and the focus extending amount, the blurring (movement) amount may be determined by a different means that provides the distance from the principal point on the image side to the image forming point. Likewise, the image shooting magnification M in Expression 2 may be obtained by a different means to determine the blurring (movement) amount.

(Example of Determination of Applied Voltage Using MTF Characteristics of Visual System)

In the step 102, it is possible to determine the applied voltage to the variable optical low-pass filter with use of a frequency other than 80% of the Nyquist frequency described in the present embodiment, and it is effective to perform optimization in accordance with various conditions. Moreover, it is possible to perform a similar arithmetic operation by a scale obtained by weighting and integrating MTFs at a plurality of frequencies. For example, a technique of determine the applied voltage by a weighted scale in consideration of MTF characteristics of a visual system is effective to further improve image quality. An example of determination of the applied voltage to the variable optical low-pass filter 30 with use of an MTF of the visual system is described below.

An example of a known sharpness evaluation value having a high correlation with a sense of sharpness perceived by a human seeing an image may be a value obtained by integrating an MTF of an image formation system weighted by the MTF of the visual system, as represented by the following expression.

$$I=[\int MTF(u) \cdot VMTF(u)du]/[\int VMTF(u)du] \quad \text{(Expression 10)}$$

Herein, MTF(u) indicates MTF characteristics of the image formation system, VMTF(u) indicates MTF characteristics of the visual system, and u indicates spatial frequency. Integration is performed within a range of the Nyquist frequency of the camera 100.

In the present embodiment, in a case in which image movement does not occur, a voltage of 5 V is applied to the variable optical low-pass filter 30 to apply a maximum low-pass effect. FIG. 14 illustrates MTF characteristics of the variable optical low-pass filter 30 at 5 V and the MTF characteristics of the visual system. The MTF of the visual system in FIG. 14 indicates an MTF in a case in which an image is displayed on a monitor by an actual pixel size (a state in which one pixel of the image corresponds to one display pixel of the monitor), and is viewed at a distance of 300 mm. A relationship between the MTF of the image formation system and the MTF of the visual system is changed by an observation distance. Accordingly, the above-described condition is used as a typical observation condition for evaluation of sharpness of the image to determine the applied voltage. When a sharpness evaluation value I at an applied voltage of 5 V is calculated by Expression 10, 0.820 is determined.

In contrast, FIG. 15 illustrates MTF characteristics of a combination of an MTF of the variable optical low-pass filter 30 in a case in which 4-μm image movement occurs during exposure and an MTF by image movement. The applied voltage is still 5 V. The sharpness evaluation value I in this case is reduced to 0.732. Accordingly, the low-pass characteristics of the variable optical low-pass filter 30 is weakened to determine, inside the camera 100, an applied voltage that makes it possible to achieve a sharpness evaluation value close to an initial sharpness evaluation value of 0.820 even in a case in which 4 μm image movement occurs, and the determined applied voltage is applied. More specifically, integration in Expression 10 is performed at discrete spatial frequencies such as, for example, every five lines per mm to enhance speed, and the MTF characteristics of the variable optical low-pass filter 30 at a voltage that is gradually changed are calculated, thereby determining the closest value. The MTF characteristics of the variable optical low-pass filter 30 at each voltage are held inside the camera 100, as described above. The sharpness evaluation value is 0.804 in a case in which the applied voltage is 2 V, and is 0.828 in a case in which the applied voltage is 1 V. Accordingly, setting the applied voltage to 1 V makes it possible to achieve substantially equal image quality. FIG. 16 illustrates the MTF characteristics in a case in which the applied voltage is set to 1 V to change the low-pass effect of the variable optical low-pass filter.

(Correction of Image Movement by Zooming)

In addition to the image movement by hand movement and the panning operation described in the present embodiment, it is possible to correct blurring caused by image movement by a zooming operation (image magnification change) during image shooting. In the image movement by zooming, an image movement amount is different depending on a position in the screen with respect to the same change in focal length, as illustrated in FIGS. 17 and 18. It is to be noted that FIG. 18 schematically illustrates image movement at a position closer to a center of the screen, as compared with FIG. 17. A movement amount in an image height direction is the same with respect to the same image height (a distance from the center of the screen); however, component amounts in the horizontal direction and the vertical direction with respect to the movement amount are changed even with respect to the same image height. An amount of degradation in sharpness caused by image movement is also different depending on the position in the screen. Accordingly, in order to perform correction properly, it is necessary to two-dimensionally divide the variable optical low-pass filter 30 and provide different low-pass characteristics for each portion in the screen.

The image movement amount by zooming is changed depending on the position in the screen as described above; however, it is possible to simply represent a correction amount with respect to the entire screen around the center of the screen where an important subject is present and apply the correction amount. In this case, the following process is performed.

The control microcomputer 13 obtains a focal length change amount per unit time from the lens controller 4 during image shooting, and thereafter predicts a focal length change amount caused during exposure. The control microcomputer 13 determines an image magnification change amount from a thus-predicted focal length change. The control microcomputer 13 uses a point at an image height of 6 mm as a position representing the entire screen, and determines an image movement amount in the image height direction caused during exposure time at the position at the image height of 6 mm. A correction amount is determined, by a method similar to the method having been already described, with use of values obtained by multiplying the movement amount in the image height direction by 0.7 times and distributing the multiplied movement amount to the horizontal direction and the vertical direction (values corresponding to the image movement amounts in the horizontal direction and the vertical direction in an oblique direction at 45° with respect to the center of the screen).

In contrast, in order to precisely perform correction, the variable optical low-pass filter 30 may be two-dimensionally divided, and the image movement amounts in the horizontal direction and the vertical direction with respect to respective positions may be determined, and an applied voltage different by each portion may be applied, as described above.

[2.3 Moving Image Shooting Process]

FIG. 19 illustrates an example of a flow of the moving image shooting process. The control microcomputer 13 performs processes in steps S200 to S207 illustrated in FIG. 19 as the moving image shooting process by itself or by controlling other circuit blocks. In moving image shooting, each process having the same name as one of the processes described in the still image shooting process are basically the same process, and only differences are described below.

In the present embodiment, image data read from the image element are the same at the time of still image shooting and at the time of moving image shooting; however, in a case in which the image data is different and the pixel pitch at the time of moving image shooting is different from that at the time of still image shooting, the frequency used to determine the voltage applied to the variable optical low-pass filter 30 is changed to the Nyquist frequency determined from the pixel pitch at the time of moving image shooting in step S202. It is necessary to read an image at high speed at the time of moving image shooting, which may cause pixels to be decimated in some cases. In such a case, the pixel pitch is changed.

As step S204, an AF-AE-AWB process is added to continuously perform focus adjustment, exposure control, and a white balance process during moving image shooting. The process here is a process optimized for moving image shooting. Examples of the process may include smoothing of change to prevent a determined exposure value from abruptly changing with respect to an immediately preceding frame.

In a compression-recording process in step S206, a compression system and a file format are respectively changed to a compression system such as ITU-T H.264 and a moving image file format such as AVCHD that are suitable for moving images.

In the step S207, determination of end of moving image recording is added, and in a case in which recording is not ended, the process returns to the step S200, and a sequence of the processes is repeated. In a case in which end of recording is indicated, the moving image shooting process is ended. The end of moving image recording is indicated by temporarily turning off the switch SW2 of the shutter button 21 after start of the recording and then turning on the switch SW2 again.

(Others)

Although description has been given of a case in which image blurring is detected during exposure and is corrected in real time, it may be possible to predict MTF characteristics at the time of image shooting from image blurring in live view display, and apply low-pass characteristics corresponding to the MTF characteristics before start of exposure, and then perform image shooting.

<3. Effects>

According to the present embodiment, the low-pass characteristics of the variable optical low-pass filter 30 are changed in accordance with change in the image shooting range, which makes it possible to achieve an image with high image quality. Moreover, the following effects are achievable.

Even in a case in which image blurring is caused by hand movement or the panning operation, it is possible to compensate for degradation in sharpness caused by the image blurring by controlling the low-pass characteristics of the variable optical low-pass filter 30, and take a photograph with high image quality.

Only in terms of preventing degradation in sharpness, it is possible to achieve a similar effect by not using the variable optical low-pass filter 30; however, in this case, a false signal by aliasing is generated to cause degradation in image quality in a different way. According to the present embodiment, it is possible to adaptively cope with degradation in image quality caused by the false signal and degradation in image quality caused by image blurring. This makes it possible to always take a photograph with high image quality.

Unlike an example in related art in which mechanical switching is performed between insertion and non-insertion of the optical low-pass filter, it is possible to adaptively cope with various MTF characteristics by image blurring, and it is also possible to cope with an image blurring amount detected even during moving image shooting. This makes it possible to achieve a photograph (a moving image) with higher image quality.

Note that the effects described in the present specification are illustrative and non-limiting, and may include other effects.

<4. Other Embodiments>

The technology by the present disclosure is not limited to description of the foregoing embodiment and may be modified in a variety of ways.

For example, the variable optical low-pass filter 30 is not limited to the configuration examples illustrated in FIGS. 3 to 6, and may have any other configuration. For example, the variable optical low-pass filter 30 may have a configuration in which a low-pass filter effect is achieved by minutely vibrating the imaging element 6 with use of a piezoelectric element. Moreover, for example, the variable optical low-ass filter 30 may have a configuration in which the liquid crystal layer 33, the first electrode 34, and the second electrode 35 are interposed between a first transparent substrate 36 and a second transparent substrate 37, and the first birefringent plate 31 and the second birefringent plate 32 are disposed outside thereof. In order not to exert an influence of birefringence, an optical isotropic material such as quartz glass may be preferably used for the first transparent substrate 36 and the second transparent substrate 37.

Moreover, the above description has been given of a case in which the image shooting range is changed on the basis of change in the position of the imaging device and an operation on the imaging device as change in the image shooting range. However, the change in the image shooting range is not limited thereto, and may include a case in which an image included in the image shooting range is changed in accordance with movement of a subject or subject change. Accordingly, it is possible to achieve an effect of reducing degradation in image quality even in a case in which subject movement occurs, or any other case.

Moreover, the present technology may have the following configurations, for example.

(1) A filter control device, including a filter controller that performs control to cause low-pass characteristics of an optical low-pass filter mounted in an imaging device to be changed in accordance with change in an image shooting range.

(2) The filter control device according to (1), wherein, when the image shooting range is changed, the filter controller sets the low-pass characteristics of the optical low-pass filter to be weaker than when the image shooting range is not changed.

(3) The filter control device according to (1) or (2), wherein the change in the image shooting range is image movement caused by change in one or both of a relative position and an angle between a subject and the imaging device.

(4) The filter control device according to any one of (1) to (3), wherein a change amount by the change in the image shooting range is determined on a basis of an amount of change in a relative position and an angle between a subject and the imaging device, a focal length of an imaging lens in the imaging device, a focus extending amount of the imaging lens, and exposure time.

(5) The filter control device according to any one of (1) to (4), wherein the change in the image shooting range is change in image magnification by zooming.

(6) The filter control device according to any one of (1) to (4), wherein the change in the image shooting range is image movement by hand movement of the imaging device or a panning operation.

(7) The filter control device according to any one of (1) to (6), wherein the filter controller predicts a change amount of MTF characteristics on a basis of a change amount of the image shooting range and changes the low-pass characteristics of the optical low-pass filter to compensate for change in the MTF characteristics.

(8) The filter control device according to any one of (1) to (6), wherein the filter controller predicts a change amount of sharpness on a basis of a change amount of the image shooting range, and changes the low-pass characteristics of the optical low-pass filter to compensate for the change amount of sharpness.

(9) The filter control device according to any one of (1) to (8), further including a Raw data recorder that records data indicating the low-pass characteristics of the optical low-pass filter together with Raw data.

(10) The filter control device according to any one of (1) to (9), wherein the filter controller changes the low-pass characteristics of the optical low-pass filter in accordance with change in an image shooting range during exposure or change in an image shooting range before start of the exposure.

(11) The filter control device according to any one of (1) to (10), wherein
the optical low-pass filter includes
a liquid crystal layer,
a first electrode and a second electrode that are disposed to face each other with the liquid crystal layer in between and apply an electric field to the liquid crystal layer, and
a first birefringent plate and a second birefringent plate that are disposed to face each other with the liquid crystal layer, the first electrode, and the second electrode in between, and
the low-pass characteristics are changed in accordance with change in voltage between the first electrode and the second electrode.

(12) A filter controlling method, including performing control to cause low-pass characteristics of an optical low-pass filter mounted in an imaging device to be changed in accordance with change in an image shooting range.

(13) An imaging device, including:
an optical low-pass filter; and
a filter controller that performs control to cause low-pass characteristics of the optical low-pass filter to be changed in accordance with change in an image shooting range.

This application claims the priority on the basis of Japanese Patent Application No. 2014-140151 filed on Jul. 8, 2014 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A filter control device, comprising:
a filter controller configured to change low-pass characteristics of an optical low-pass filter based on a change in an image shooting range,
wherein the optical low-pass filter is mounted on an imaging device,
wherein the optical low-pass filter includes a liquid crystal layer, a first electrode, a second electrode, a first birefringent plate, and a second birefringent plate,
wherein the first birefringent plate and the second birefringent plate face each other, and
wherein the liquid crystal layer, the first electrode, and the second electrode are between the first birefringent plate and the second birefringent plate.

2. The filter control device according to claim 1, wherein the filter controller is further configured to:
set a first low-pass characteristics of the optical low-pass filter based on the change in the image shooting range; and
set a second low-pass characteristics of the optical low-pass filter based on the image shooting range that is not changed,
wherein the first low-pass characteristics is weaker than the second low-pass characteristics.

3. The filter control device according to claim 1, wherein the change in the image shooting range is image movement, and wherein the image movement is based on a change in at least one of a relative position of a subject and the imaging device or an angle between a subject and the imaging device.

4. The filter control device according to claim 1, wherein the filter controller is further configured to determine a change amount corresponding to the change in the image shooting range based on an amount of change in at least one of a relative position of a subject and the imaging device, an angle between the subject and the imaging device, a focal length of an imaging lens in the imaging device, a focus extending amount of the imaging lens, or an exposure time.

5. The filter control device according to claim 1, wherein the change in the image shooting range is change in image magnification, and wherein the change in the image magnification is based on a zoom operation.

6. The filter control device according to claim 1, wherein the change in the image shooting range is image movement, and wherein the filter controller is further configured to calculate the image movement based on at least one of a hand movement of the imaging device or a panning operation.

7. The filter control device according to claim 1, wherein the filter controller is further configured to:
predict a change amount of MTF characteristics based on a change amount of the image shooting range; and
change the low-pass characteristics of the optical low-pass filter to compensate for the change amount of the MTF characteristics.

8. The filter control device according to claim 1, wherein the filter controller is further configured to:
predict a change amount of sharpness based on a change amount of the image shooting range; and
change the low-pass characteristics of the optical low-pass filter to compensate for the change amount of sharpness.

9. The filter control device according to claim 1, further comprising a Raw data recorder configured to record data, wherein the data indicates Raw data and the low-pass characteristics of the optical low-pass filter.

10. The filter control device according to claim 1, wherein the filter controller is further configured to change the low-pass characteristics of the optical low-pass filter based on at least one of the change in the image shooting range during exposure or the change in the image shooting range before start of the exposure.

11. The filter control device according to claim 1,
wherein the first electrode and the second electrode face each other,
wherein the liquid crystal layer is between the first electrode and the second electrode,
wherein the first electrode and the second electrode apply an electric field to the liquid crystal layer, and
wherein the filter controller is further configured to change the low-pass characteristics of the optical low-pass filter based on a change in a voltage between the first electrode and the second electrode.

12. A filter controlling method, comprising:
determining a change in an image shooting range; and
changing low-pass characteristics of an optical low-pass filter based on the change in the image shooting range,
wherein the optical low-pass filter is mounted on an imaging device,
wherein the optical low-pass filter includes a liquid crystal layer, a first electrode, a second electrode, a first birefringent plate, and a second birefringent plate,
wherein the first birefringent plate and the second birefringent plate face each other, and
wherein the liquid crystal layer, the first electrode, and the second electrode are between the first birefringent plate and the second birefringent plate.

13. An imaging device, comprising:
an optical low-pass filter; and
a filter controller configured to change low-pass characteristics of the optical low-pass filter based on a change in an image shooting range,
wherein the optical low-pass filter includes a liquid crystal layer, a first electrode, a second electrode, a first birefringent plate, and a second birefringent plate,
wherein the first birefringent plate and the second birefringent plate face each other, and
wherein the liquid crystal layer, the first electrode, and the second electrode are between the first birefringent plate and the second birefringent plate.

* * * * *